TRAFFIC SIGNAL CONTROLLER

Filed Aug. 28, 1952 13 Sheets-Sheet 1

INVENTOR.
Walter M. Jeffers
BY
D. Emmett Thompson
ATTORNEY

Oct. 4, 1955 W. M. JEFFERS 2,719,958

TRAFFIC SIGNAL CONTROLLER

Filed Aug. 28, 1952 13 Sheets-Sheet 2

INVENTOR.
Walter M. Jeffers
BY
D. Emmett Thompson
ATTORNEY

Oct. 4, 1955 W. M. JEFFERS 2,719,958

TRAFFIC SIGNAL CONTROLLER

Filed Aug. 28, 1952 13 Sheets-Sheet 3

INVENTOR.
Walter M. Jeffers
BY
D. Emmett Thompson
ATTORNEY

Oct. 4, 1955 W. M. JEFFERS 2,719,958
TRAFFIC SIGNAL CONTROLLER
Filed Aug. 28, 1952 13 Sheets-Sheet 4

INVENTOR.
*Walter M. Jeffers*
BY
*D. Emmett Thompson*
ATTORNEY

INVENTOR.
Walter M. Jeffers
BY
D. Emmett Thompson
ATTORNEY

INVENTOR.
Walter M. Jeffers
BY
D. Emmett Thompson
ATTORNEY

INVENTOR.
Walter M. Jeffers
BY
D. Emmett Thompson
ATTORNEY

Oct. 4, 1955 W. M. JEFFERS 2,719,958

TRAFFIC SIGNAL CONTROLLER

Filed Aug. 28, 1952 13 Sheets-Sheet 8

INVENTOR.
Walter M. Jeffers
BY D. Emmett Thompson
ATTORNEY

Oct. 4, 1955 W. M. JEFFERS 2,719,958

TRAFFIC SIGNAL CONTROLLER

Filed Aug. 28, 1952 13 Sheets-Sheet 9

INVENTOR.
Walter M. Jeffers

BY
D. Emmett Thompson

ATTORNEY

Oct. 4, 1955 W. M. JEFFERS 2,719,958

TRAFFIC SIGNAL CONTROLLER

Filed Aug. 28, 1952 13 Sheets-Sheet 10

INVENTOR.
Walter M. Jeffers
BY
D. Emmett Thompson
ATTORNEY

INVENTOR.
Walter M. Jeffers
BY
D. Emmett Thompson
ATTORNEY

INVENTOR.
Walter M. Jeffers
BY
D. Emmett Thompson
ATTORNEY

INVENTOR.
Walter M. Jeffers
BY
D. Emmett Thompson
ATTORNEY

United States Patent Office 2,719,958

Patented Oct. 4, 1955

2,719,958

TRAFFIC SIGNAL CONTROLLER

Walter M. Jeffers, Syracuse, N. Y., assignor to Crouse-Hinds Company, Syracuse, N. Y., a corporation of New York Application August 28, 1952, Serial No. 306,913

6 Claims. (Cl. 340—37)

This invention relates to highway traffic signal controllers and more particularly to a controller for operating the normal go or semi-actuated system. In this system, the go signal is displayed continuously on one highway until traffic approaches on the intersecting highway. The traffic approaching on the second highway actuates a detector or road element which energizes the controller and which, upon such energization, operates through a cycle to shift the signals so that the go signal is displayed on the second highway and the stop signal on the first highway. Usually, the controller is provided with contacts to also properly display a caution signal between changes in the go and stop signals.

In controllers of this type, there is included means whereby the go signal is displayed for at least a predetermined minimum of time on the first or main highway and for a predetermined minimum of time to the second highway or cross street, this minimum time being enlargeable up to a predetermined maximum to permit the passage of a plurality of vehicles approaching on the cross street during display of the go signal on the cross street.

This invention has as an object a controller of the type referred to embodying a particularly simple construction employing only one electron discharge tube and two relays to effect proper time operation of a motor driven cam shaft.

The invention consists in the novel features and in the combinations and constructions hereinafter set forth and claimed.

In describing this invention, reference is had to the accompanying drawings in which like characters designate corresponding parts in all the views.

In the drawings—

Figures 1 to 11 consist of schematic wiring diagrams showing the circuit arrangement of the controller in the various positions or intervals of the signal cycle, and in which the heavy lines indicate the circuits that are then conducting current.

In general the controller consists of a cam shaft 20 on which there is fixedly mounted a series of cams which actuate respectively a series of contacts 41—57, certain of these contacts, such as 52—57, are connected in the signal circuits. A motor 58 is connected to the cam shaft and has a running coil 59. The motor is provided with a starting circuit and a running circuit, the running circuit being controlled by the contact 41 and the arrangement is such that the motor imparts intermittent rotation to the cam shaft to move the same step by step through a series of positions or intervals to effect cyclic display of the traffic signals.

The starting circuit to the motor coil 59 is controlled by a relay connected in the output circuit of an electron discharge tube. The control element of this tube is periodically supplied with a negative potential to prevent current passage through the tube and the relay. A capacitor is connected to the control element for receiving the full line potential or charge, and is connected to one of several discharge circuits which correspond to certain intervals through which the cam shaft is moved. These discharge circuits including adjustable resistors to control the time period of the discharge of the capacitor and accordingly the duration of the corresponding interval.

Essentially this portion of the controller is disclosed in my Patent No. 2,288,458, issued June 30, 1942. The cam shaft unit including the cams and associated contacts may be of the structural arrangement disclosed in Patent No. 2,301,999 to Carl H. Bissell, November 17, 1942, and the specific cam structure employed may be of that type disclosed in Patent No. 2,163,864 to Carl H. Bissell, June 27, 1939.

Figure 1:
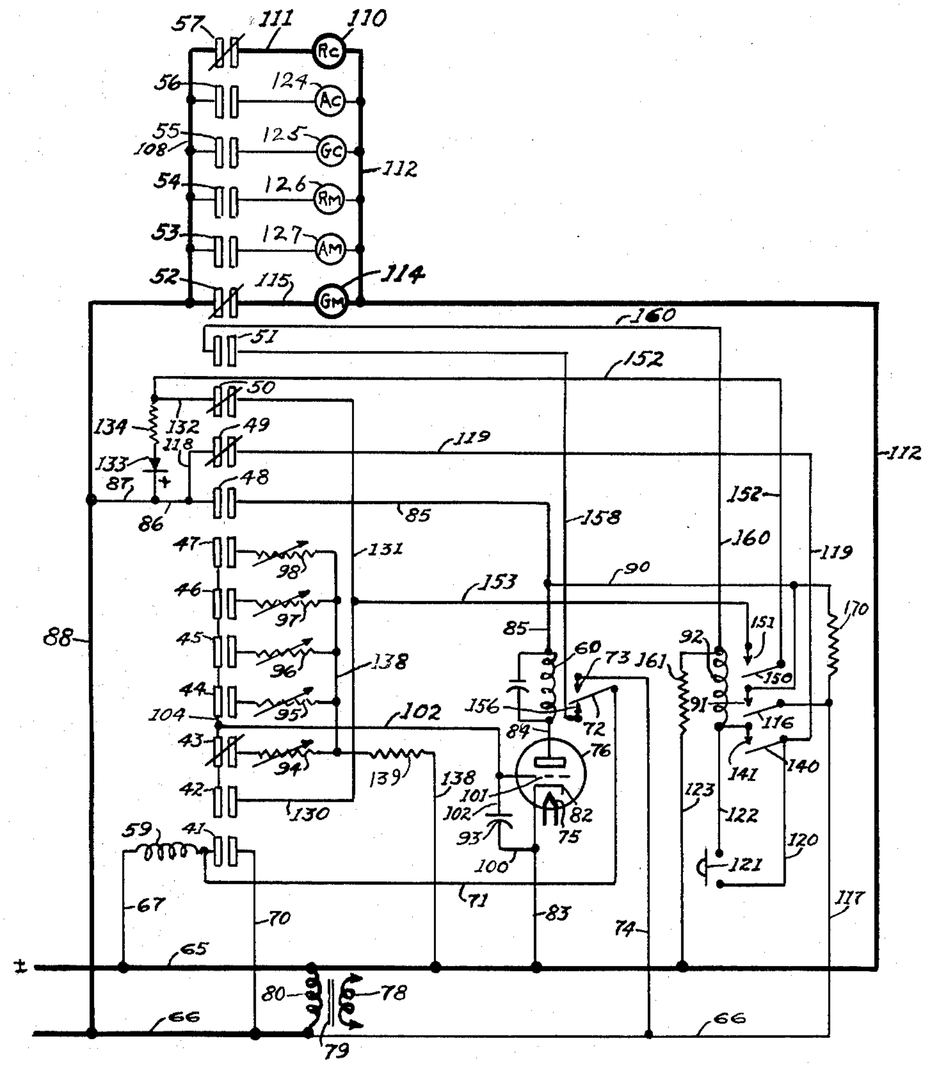
Figure 1 illustrates the controller in normal position, with the go or green signal being displayed to the main street, and the red or stop signal to the cross street.

The plate or output circuit of the tube, including the starting relay 60, extends through contacts 48 which are closed during all intervals except main street go, and this circuit has a branch extending through a contact on a second relay which is controlled by a detector element positioned in the cross street for actuation by traffic approaching the intersection on the cross street whereby the circuit through the relay is completed by the cam contacts 48, or a contact on the detector relay. Normally, the controller stands, as illustrated in Figure 1, displaying the go signal to the main street and with the contact 48 open and with the detector relay deenergized. When this relay is energized by actuation of the detector, the output circuit from the tube is closed and the relay 60 energized, closing the starting circuit to the motor, and the controller then operates through the succession of intervals to effect shifting of the traffic signals including display of the caution or amber signal on the main street, display of the go signal to the cross street, display of the amber signal on the cross street and thence, to the display of the go signal again on the main street.

There is an interval or position of the controller for the display of each of the signals except the go signal on the cross street and for the display of that signal, there are a plurality of intervals, some of which may be extended for greater duration.

The circuit arrangement is such that if the detector is actuated during the first part of the display of the green signal on the cross street, the cam shaft will be stopped and timed out during one of the intervals through which the cam shaft passes during the cross street go signal display. This results in an extension of the time the go signal is displayed on the cross street to accommodate the passage of more than one vehicle approaching on the cross street. The duration of the extension during these intervals is controlled by the setting of the resistor associated with the capacitor during that interval.

Referring now particularly to the schematic diagrams Figures 1 to 11, wires 65, 66, designate the 115 volt, 60 cycle power supply. One side of the motor coil 59 is cycle power supply. One side of the motor coil 59 is connected to the line 65 by wire 67. The opposite end of the coil is connected to the line 66 by wire 70 through cam shaft contacts 41. This end of the coil is also connected to the wire 66, through wire 71, movable contact 72 of relay 60, fixed contact 73, and wire 74. The cathode heater 75 of tube 76 is connected to the secondary 78 of a transformer 79, the primary 80 of which is connected across the line 65, 66. The cathode 82 is connected to the line 65 by wire 83. The relay 60 is connected to the plate of the tube through wire 84, the opposite side of the relay coil 60 being connected to wire 85 extending to the contacts 48, the circuit being completed to the wire 66, through wires 86, 87, 88. The wire 85 is also connected to a wire 90 extending to the stationary contact 91 of the detector relay 92.

The timing of an interval is accomplished by a capacitor 93 and one of the adjustable resistors 94—98. The capacitor 93 is connected to the wire 83 by wire 100, and to the control grid 101 of the tube 76 by wire 102. The wire 102 extends to a common bus 104 connecting contacts 42—47 together.

As the controller stands in Figure 1, which will be referred to as the first position or interval, contacts 52, 57 are closed. The cam contacts in all of the views 1 to 11 that are closed are indicated by a diagonal line extending through the contacts. The heavy lines indicate the parts carrying current. One member of each pair of the contacts 52—57, is connected to the wire 108 which, in turn, is connected to the wire 88, whereby a hot feed is provided to these contact elements from the line 66. With contacts 57 closed, the stop or red signal 110 on the cross street is energized through contacts 57, wire 111, common wire 112, to the wire 65. The go signal 114 to the main street is energized through contacts 52, wire 115, wire 112.

The circuit of relay 60 is open because contacts 48 are open, and contact 91 of relay 92 is not engaged by the movable contact 116 which is connected through wire 117 to the line 66. Accordingly, no current is flowing through the tube 76. The relay 60 is therefore deenergized with contact 72 out of engagement with contact 73. The controller will remain in this position until a car approaches on the cross street and actuated the detector 121.

Relay 92 is supplied with power from wire 86, wire 118, contacts 49, which are closed during all intervals except main street amber, wire 119, wire 120, the detector element 121, wire 122, to the relay coil 92, wire 123, to the line 65. Accordingly, if the detector element 121 is actuated, a circuit is completed through the relay coil 92, moving the contact 116 into engagement with the contact 91. This completes a circuit from line 66, wire 117, contacts 116, 91, wire 90, wire 85, relay coil 60, wire 84, tube 76, wire 83, to the opposite side 65 of the line. This effects engagement of the contacts 72, 73, providing a hot feed from line 66 through wire 74, contacts 72, 73, wire 71, to the motor coil 59, thence through wire 67 to the other side 65 of the line. This effects initial rotation of the motor and of the cam shaft, whereupon cam 21 closes contacts 41 to provide a running circuit for the motor through wire 70 until the cam shaft has been advanced to the next interval when the contacts 41 open.

Figure 2:
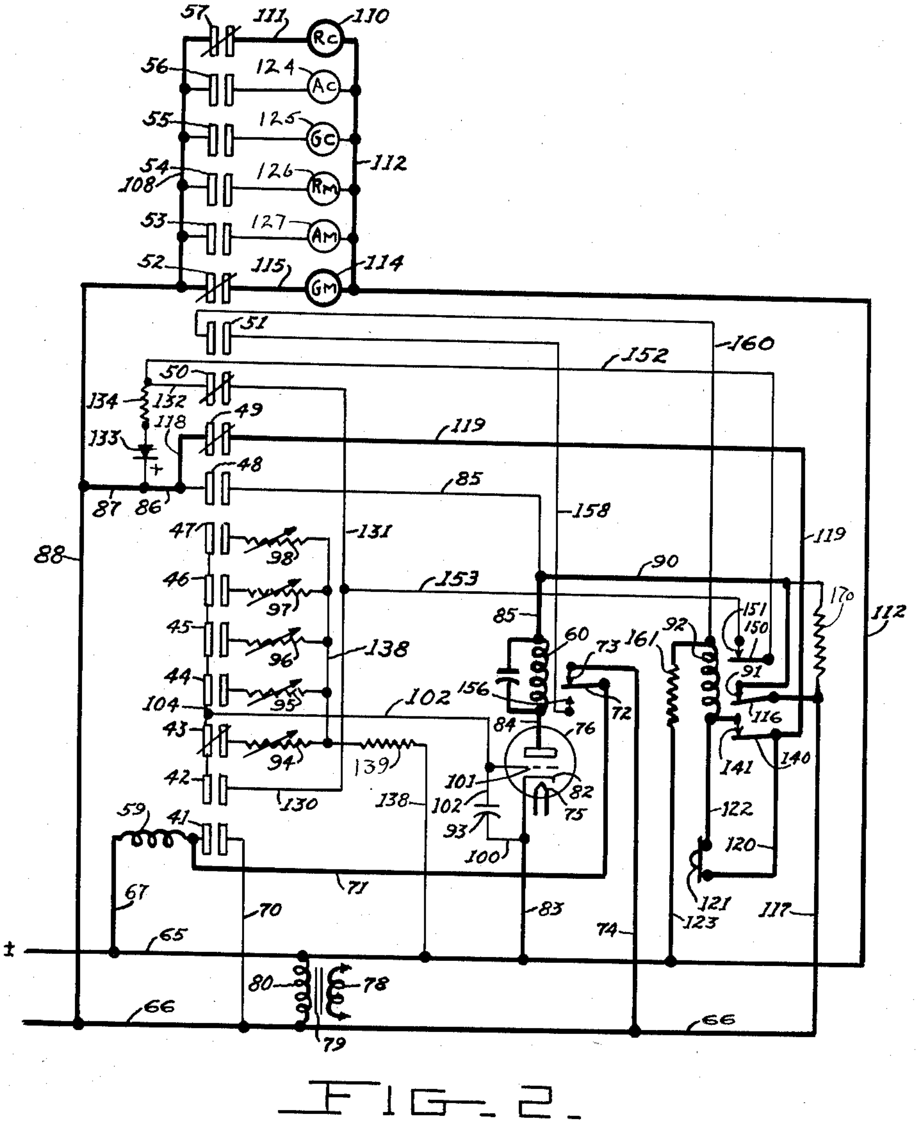
Figure 2 illustrates the controller upon actuation of one of the detector elements in the cross street.
Figure 3:
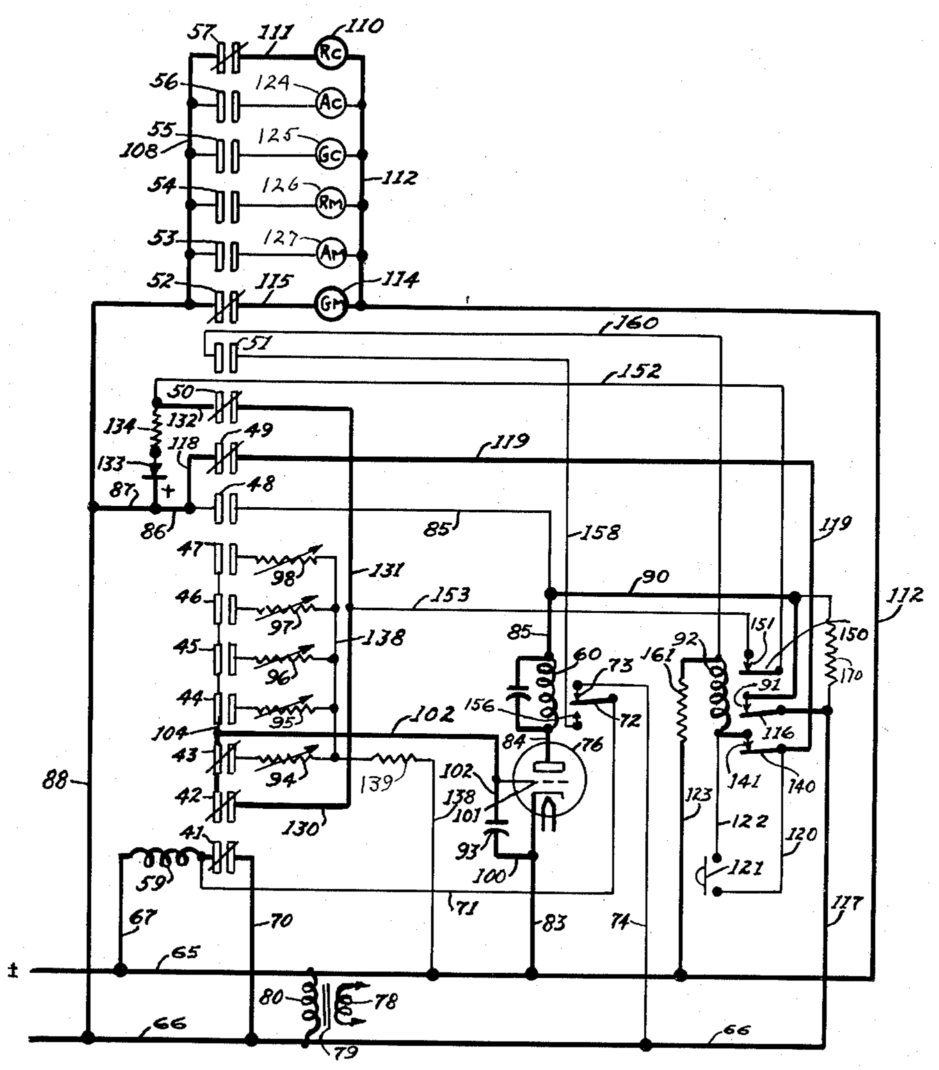
Figure 3 illustrates the condition when the cam shaft is moving or running from the position shown in Figures 1 and 2 to the position shown in Figure 4.

Figure 2 shows the circuit arrangement upon actuation of the detector element 121. Figure 3 shows the controller running from position one to position two.

While the motor is advancing the cam shaft from one position to the next position, contacts 42 are closed. These contacts 42 are in the charging circuit of the capacitor 93. Contacts 50 were already closed, and this provides a feed circuit for the charging circuit. This circuit extending from the line 65, through wires 83, 100, capacitor 93, wire 102, bus 104, contacts 42, wire 130, feed wire 131, contacts 50, wire 132, rectifier 133, wires 87, 88, to the opposite side 66 of the power supply. Accordingly, the capacitor is quickly charged to practically peak line voltage of the power supply. The resistor 134, connected between wire 132 and rectifier 133, serves only to limit the current surge through the rectifier, as will be understood. The rectifier is connected so that the charge placed on the side of the capacitor connected to the grid 101 is negative, thus preventing current flow through the tube and causing relay 60 to open. The contacts 41, 42, are closed only during each rotation of the cam shaft. That is, these contacts close immediately upon rotation of the cam shaft by closure of the starting circuit and open when the shaft has been advanced to the next position. During the movement of the cam shaft from one position to the next, there is some overlapping in the operation of the charging contacts 42 and the discharging contacts 43—47. However, this does not have any effect on the charging of the capacitor, inasmuch as the charging current available through the rectifier is entirely sufficient to charge the capacitor to substantially full line voltage instantaneously, and any current by-passed through the discharge circuit during this momentary overlapping of the contacts does not adversely affect the charge on the condenser.

Figure 4:
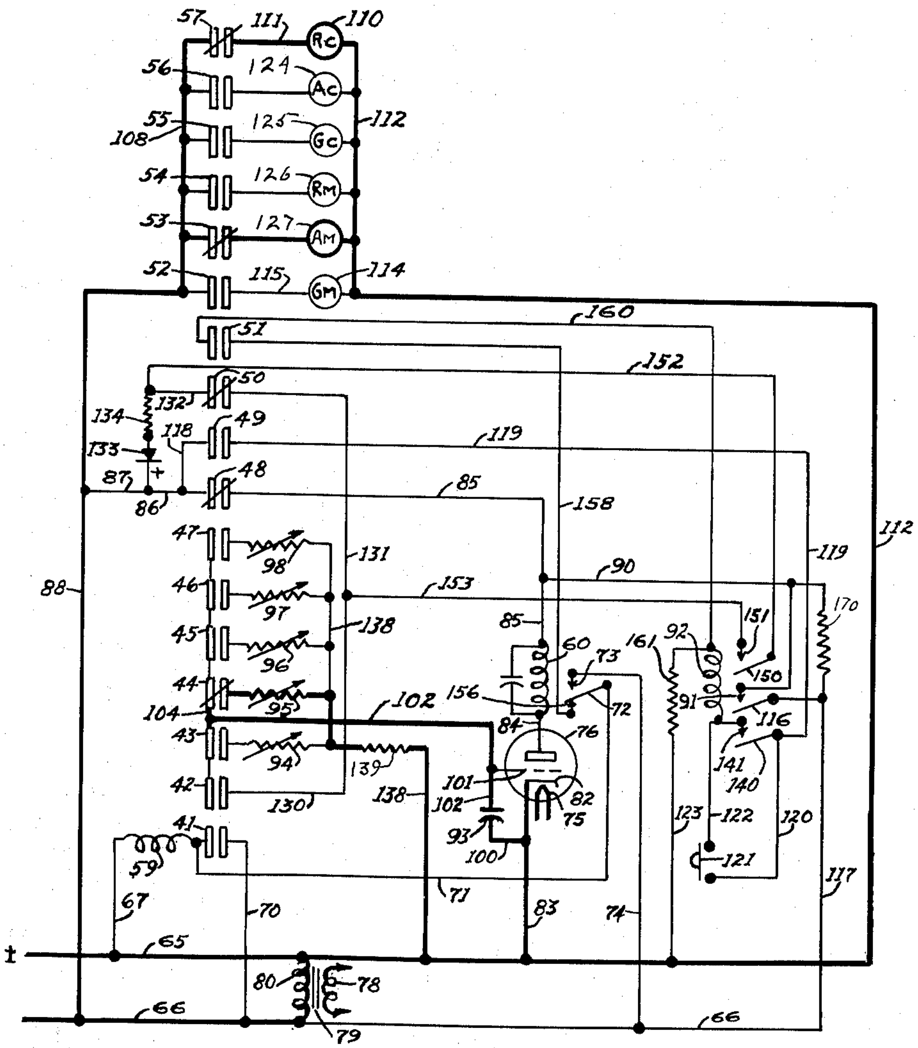
Figure 4 illustrates the controller advanced to the second interval or position displaying the amber or caution signal to the main street.

The controller has now advanced to the second position or interval and stopped because running contacts 41 have opened and contacts 72, 73, are open. The contacts 52 are open, thereby deenergizing the go signal to the main street and the contacts 53 are closed, energizing the amber signal 127 to the main street. Also, contacts 44 have closed to complete a discharge circuit for the now charged capacitor 93. This circuit extends through wire 102, bus 104, contacts 44, resistor 95, wires 138, 65, 83 and 100. The tube 76 will not function to pass current for operation of the relay 60 until the charge on the caacitor 93 has been reduced to a predetermined value. The length of time needed for such reduction depends upon the setting of the resistor 95. Figure 4 shows the controller in this second position.

There is a resistor 139 connected in the wire 138 between the resistors 94—98 and the wire 65. The purpose of the resistor 139 is to provide a minimum resistance in the discharge circuit so that in the event of any of the resistors 94—98 being turned to the zero position, there would not be a short circuit around the capacitor 93.

When the charge on the capacitor 93 has been bled off through the resistor 95 and reduced to the proper level, relay 60 is again energized through wire 85, contacts 48, wires 86, 88, line 66. As previously stated, contacts 48 are closed during all intervals of the cycle except during display of the go signal on the main street. Accordingly, relay contacts 72, 73, will again be closed, establishing the starting circuit to the motor coil 59 and, in conjunction with the running contacts 41, the motor will advance the cam shaft to the next interval or position three shown in Figure 5. In this position, signal contacts 54, 55, are closed, displaying the green signal 125 to the cross street and the red signal 126 to the main street. In this third position of the cam shaft, contacts 45 are closed, connecting the associated resistor 96 in the capacitor discharge circuit. Accordingly, this first interval of the display of the green signal on the cross street is timed out by the setting of the resistor 96. At the expiration of this interval, the tube 76 again passes current to energize the relay 60 through the closed contacts 48, again establishing the starting circuit for the motor. The cam shaft is advanced to the next or fourth position by the motor, see Figure 6, but in this position the contacts 50 are open, thus deenergizing the feed wire 131 for the charging circuit for the capacitor 93. In the controller arrangement herein shown, these contacts 50 remain open during the fourth, fifth, sixth, seventh, eighth and ninth positions of the cam shaft corresponding to the intervals, except the first, for display of cross street green signal. In other words, the motor runs continuously and the shaft is rotated rapidly through the intervals corresponding to these positions.

When the cam shaft has been advanced to the tenth position, the motor stops because in moving from the ninth to the tenth position contacts 50 are closed providing a charge on the capacitor 93. In this position, see Figure 7, contacts 47 are closed, putting the resistor 98 into the discharge circuit. In this position, the green signal to the cross street has been deenergized and there is displayed the amber signal 124 to the cross street and red signal 126 to the main street. This interval is timed out by the setting of resistor 98. The contacts 48 are closed so that when the interval is timed out by the resistor 98, the tube 76 passes current to energize the relay 60 to again complete the starting circuit to the motor 59 and the cam shaft is advanced to the first position, completing the cycle of operation and with the display of the green signal on the main street and red signal on the cross street.

Figure 8:
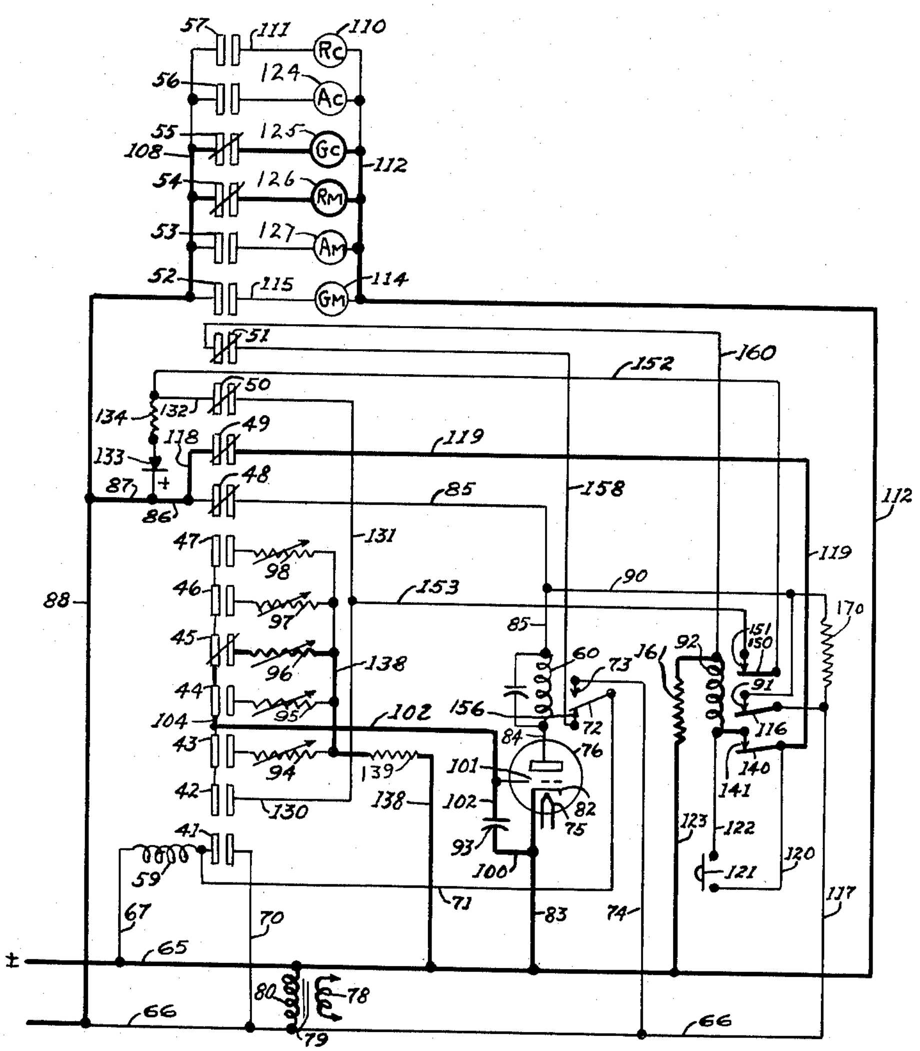
Figure 8 illustrates the cam shaft positioned as in Figure 5, except that the detector element has been actuated by a car approaching on the cross street during the first interval of the display of the cross street green signal.
Figure 9:
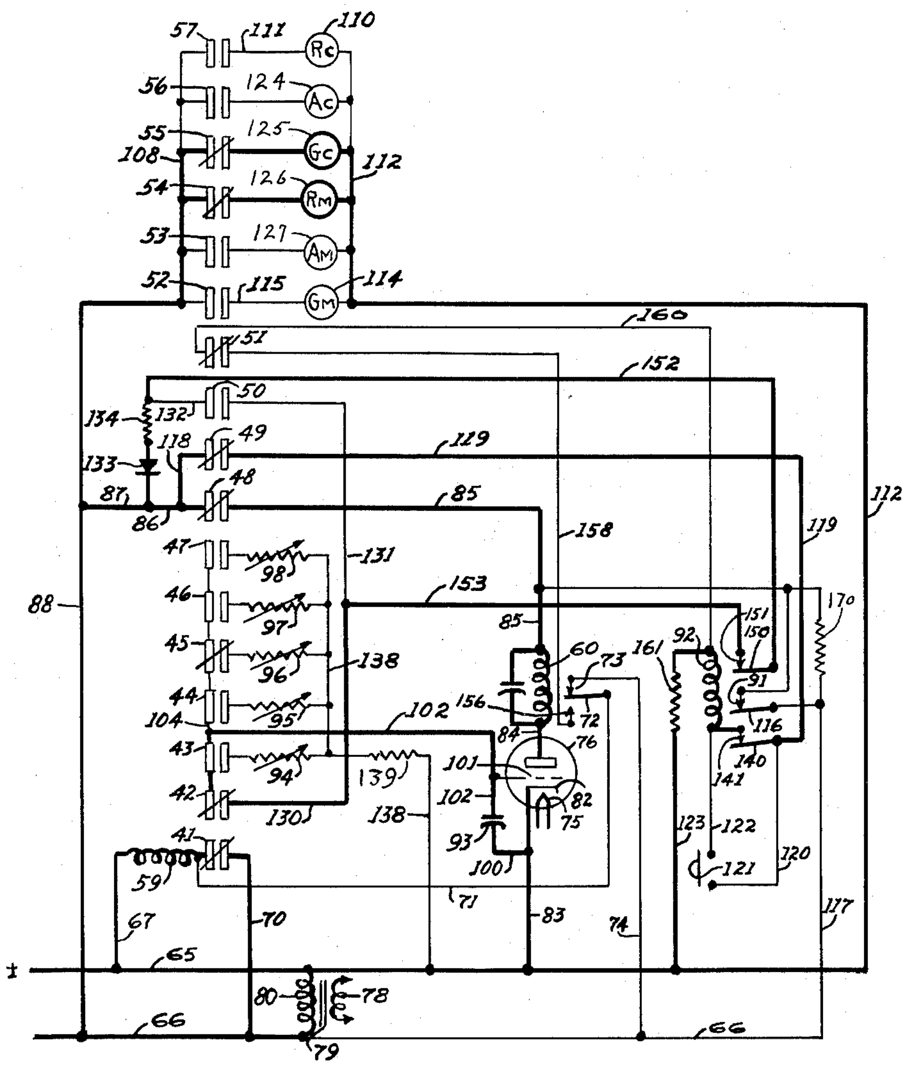
Figure 9 illustrates the beginning of the movement of the cam shaft following the actuation, as in Figure 8.

Figure 8 illustrates the situation when a vehicle has approached the intersection on the cross street while the controller is in the third position, that is, the controller has been advanced from position 1 to position 3 because of actuation by a vehicle on the cross street effecting display of the green signal to the cross street. A second car has now actuated the detector element 121 with the controller in the third position. This resulted in energizing the relay coil 92 which caused contact 140 to engage contact 141. The engagement of these contacts establishes a holding circuit for the relay coil 92, the circuit extending from wire 66 through wires 88, 87, 86, 118, contacts 49, wire 119, contacts 140, 141, relay coil 92, wire 123 to wire 65.

Figure 5:
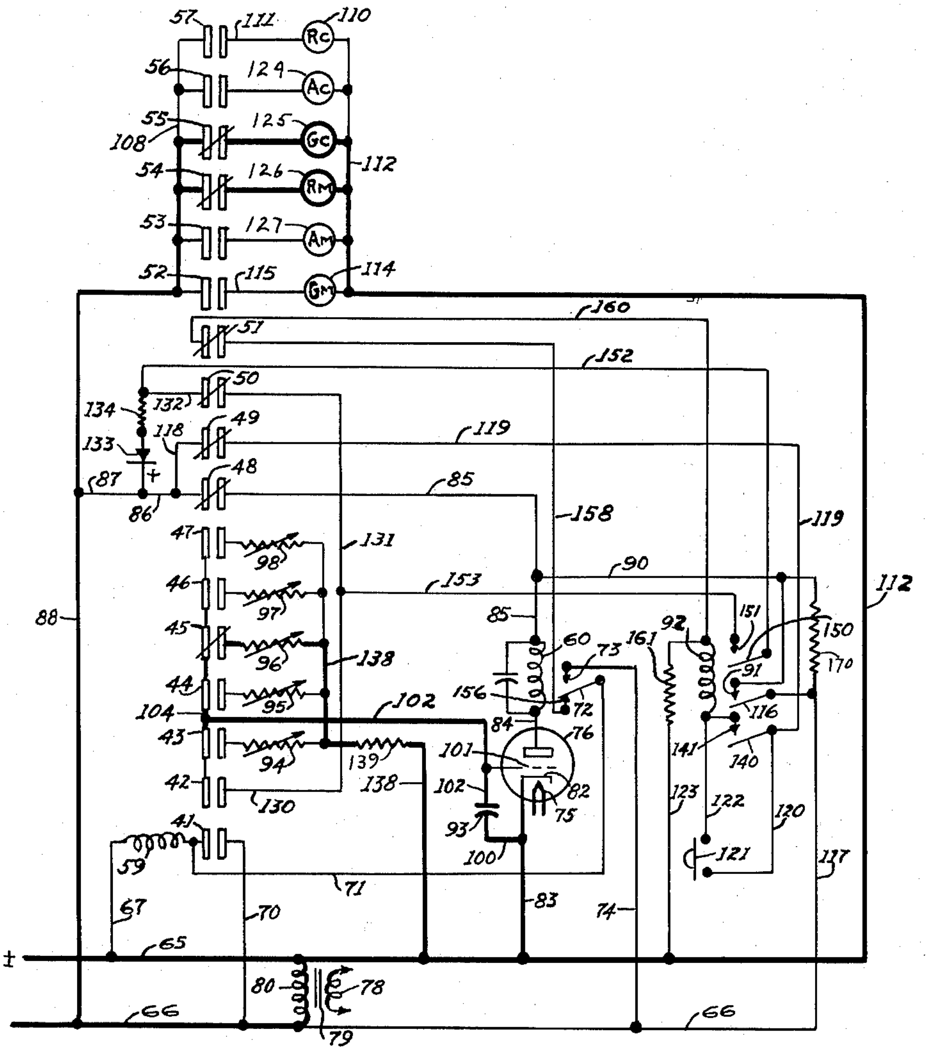
Figure 5 illustrates the controller advanced to the third position, or interval, wherein the green signal is displayed on the cross street and the red signal to the main street.
Figure 6:
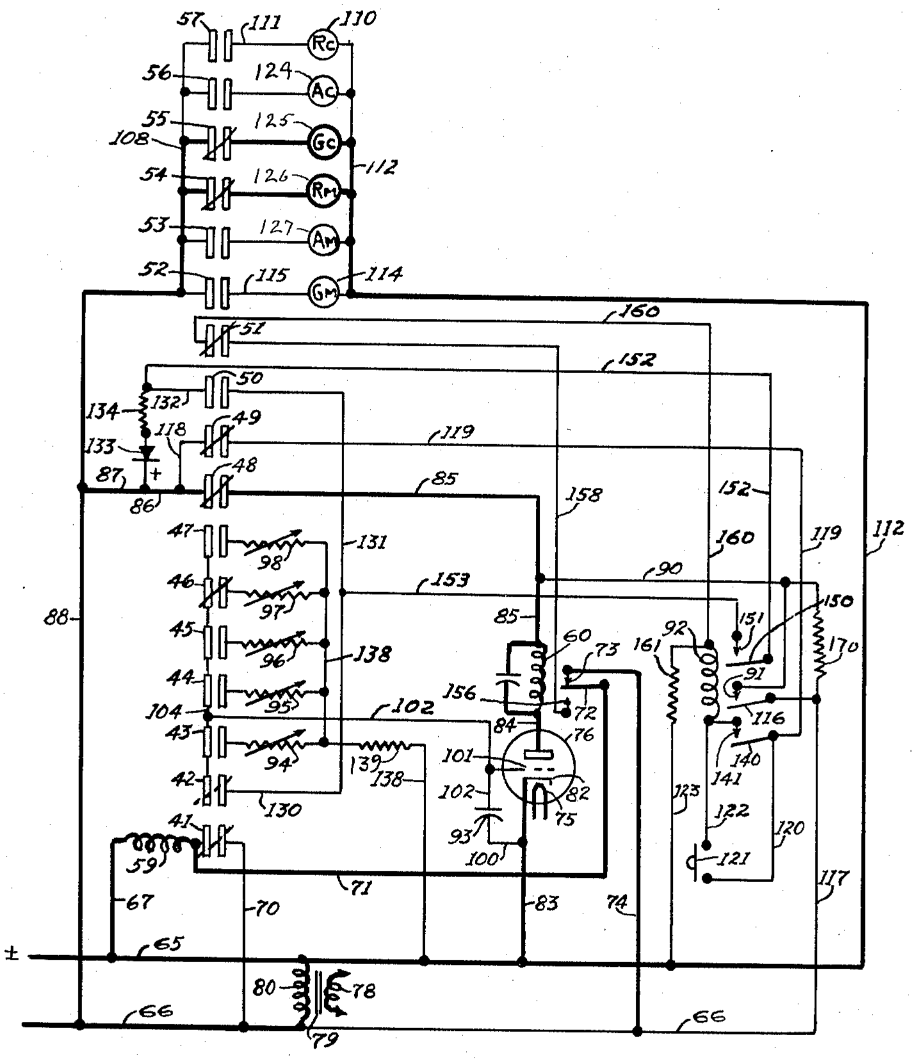
Figure 6 illustrates the controller advanced to the fourth position or second interval of the display of the green signal to the cross street.
Figure 7:
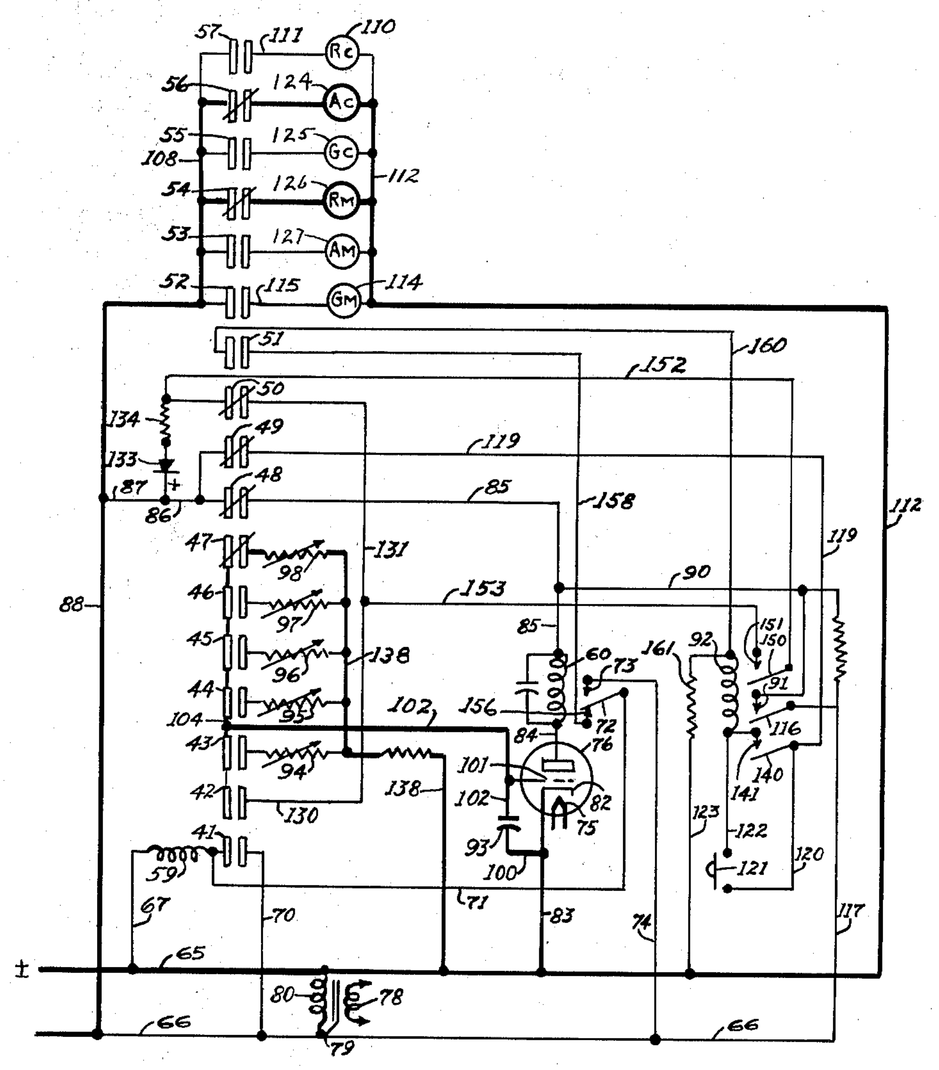
Figure 7 illustrates the arrangement when the controller has been advanced to position 10 wherein the amber or caution signal is displayed to the cross street and the red signal continuing on the main street.

With the controller in this position as previously explained in connection with Figure 5, the charge on the capacitor 93 is being bled off through the resistor 96. If there had been no second actuation, the controller would then have advanced to position 4, and during this advancement the contacts 50 would open. The feed circuit for the capacitor charging circuit would therefore be open and the circuit through relay 60 would remain energized and the controller would have advanced through positions 5, 6, 7, etc. However, in view of this second actuation during the third interval, the relay coil 92 is held in (see Figure 9) with contact 150 engaging contact 151. This establishes an alternate feed circuit for the charging circuit, this circuit extending from wire 66 through wires 88, 87, rectifier 133, resistor 134, wire 152, contacts 150, 151, wire 153 to wire 130, closed contacts 42, bus 104, wire 102, capacitor 93, wire 100, 83 to the other side 65 of the line, whereby the negative potential on the control grid 101 causes the tube to cease functioning and to deenergize relay 60, and causing contact 72 to move into engagement with contact 156. This happens during rotation of the cam shaft from position 3 to position 4 during which time the running contacts 41 are closed. The engagement of contact 72 with 156 effects deenergization of the relay 92. This is brought about by extending a circuit from the wire 66 to the top of the relay coil 92, the bottom of which is already connected to the same wire 66 through the holding contacts 140, 141, as previously explained.

Figure 10:
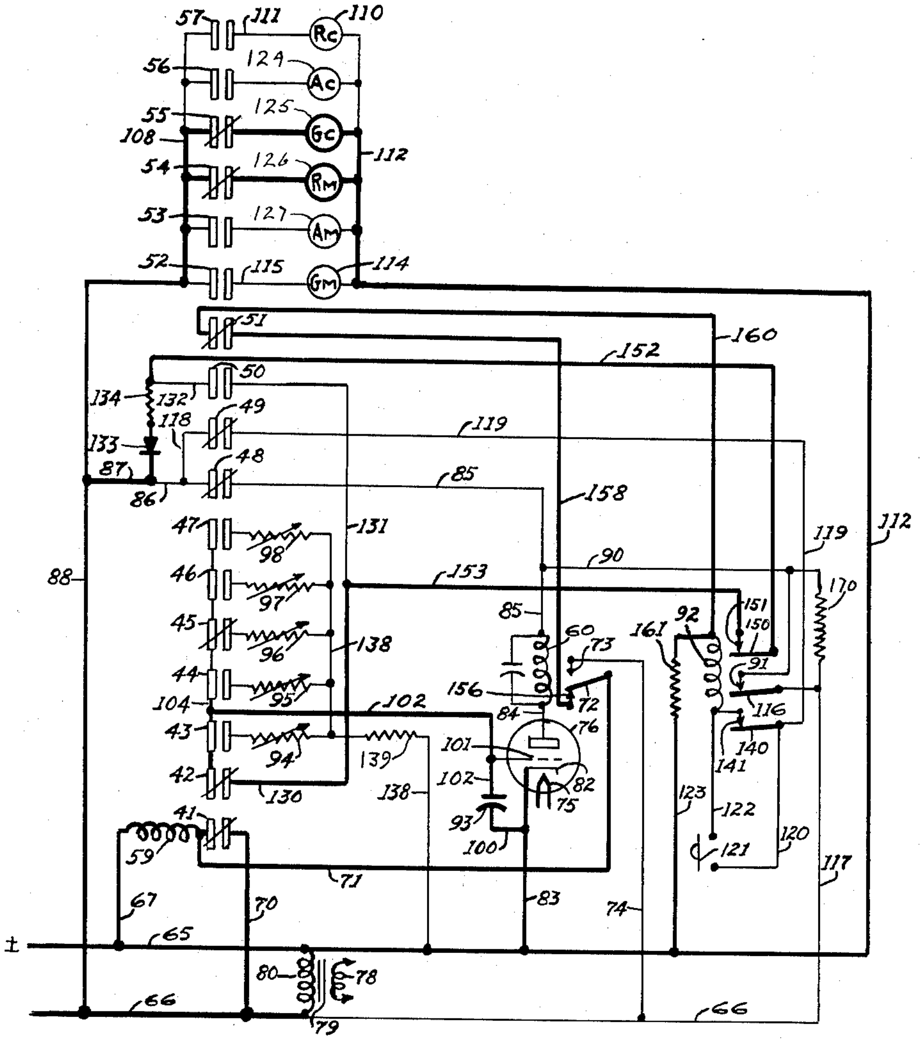
Figure 10 illustrates the circuit arrangement an instant later in advancement of the cam shaft from that shown in Figure 9.

This opposing potentializing circuit for relay coil 92, see Figure 10, extends from line 66 through wire 70, motor running contacts 41, wire 71, contacts 72, 156, wire 158, closed cam contacts 51, wire 160, to the top of relay coil 92. Accordingly, since both ends of the coil 92 are of the same potential because they are connected to the same wire 66, no current flows in the coil 92 and the relay opens. To prevent excessive current surge through wire 123 to the opposite side 65 of the line, a resistor 161 is connected in the wire 123.

Figure 11:
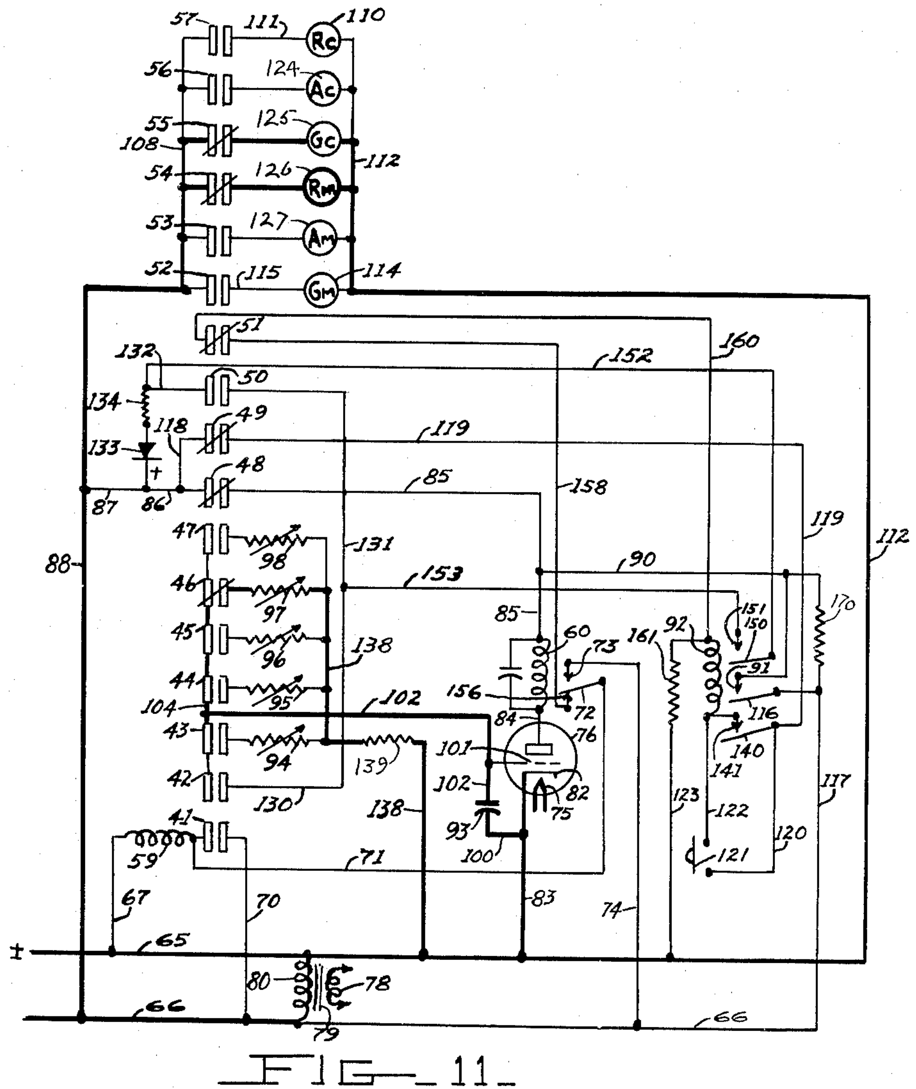
Figure 11 illustrates the controller having moved from position 3, shown in Figure 8, to position 4, and being timed out for an extension of the fourth interval.

When the cam shaft has been rotated or advanced to position 4, the contacts 46 are closed, see Figure 11, these contacts remaining closed during the remaining intervals of the display of the cross street green signal. Accordingly, the charged capacitor 93 is being now discharged through a discharge circuit, including the resistor 97. When the capacitor is discharged, the tube 76 will again conduct current closing relay 60 to establish a starting circuit and the cam shaft will move to the fifth position, and if there are no additional actuations of the detector element 121, the motor 58 will spin the cam shaft through the remaining positions or intervals of the cross street green signal and comes to rest only upon display of the amber signal on the cross street, as previously explained. However, if there is additional actuations of the detector element 121 during the remaining intervals of the display of the cross street green signal, the relay 92 will be energized and held closed by the holding circuit contacts 140, 141, and the operation just described will be repeated. In the case of each of these subsequent actuations during these intervals, the charged capacitor 93 will be discharged through the resistor 97. In other words, the resistor 97 is the one used to time out the extension periods. It will be observed that actuation during any intervals of the display of the cross street green signal, except the last interval, will result in the next succeeding interval being extended.

A resistor 170 is connected between the wires 90 and 117 around the contacts 91, 116. The purpose of this resistor is to provide a slight current flow through the tube 76 in order to prevent premature depreciation of the cathode 82 while the tube is inactive during long periods of time, such as the continued display of the main street green signal 114 because of no actuation of the detector elements 121 by cross street traffic. Under such circumstances, the contacts 48 and the contacts 91, 116, are open whereby the tube 76 is inactive.

Figure 12:
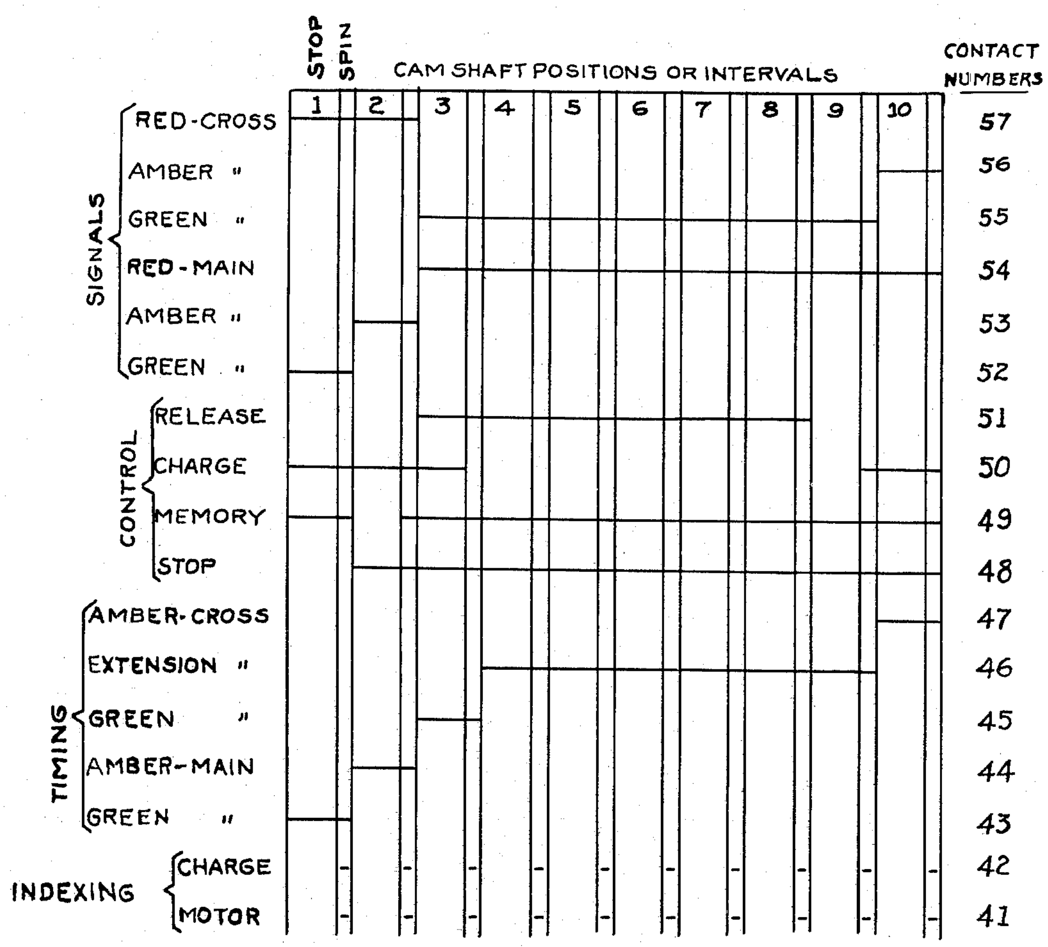
Figure 12 is a sequence chart showing the cam unit contacts closed in each position of the signal cycle.
Figure 13:
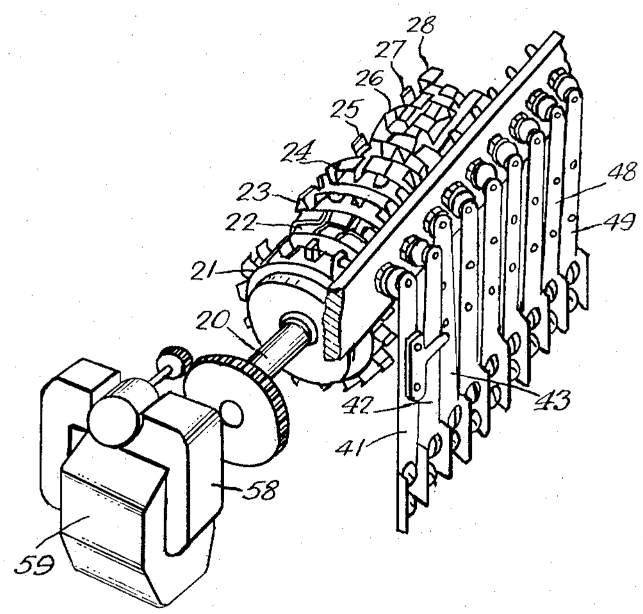
Figure 13 is a diagrammatic view in perspective of a portion of the cam shaft unit showing the driving motor therefor.

It will be apparent that the maximum extension of the green signal to the cross street is determined by the adjustment or setting of the resistor 97, and also by the number of extension positions or intervals set on the cam shaft. As disclosed herein, there are six such intervals corresponding to cam shaft positions 4, 5, 6, 7, 8, 9, as shown on the chart, Figure 12.

Contacts 49 may be referred to as the memory contacts in that they not only furnish a circuit for energizing the relay 92 but also for holding it closed. These contacts 49 are closed during all intervals of the timing except the second interval in which the red signal is displayed on the cross street and the amber signal displayed on the main street. Accordingly, power is available to energize the relay 92 by detector actuation and to hold the relay closed during all the intervals the contacts 49 are closed.

Contacts 51 may be referred to as release contacts in that they complete the opposing potentializing circuit to relay 92. These contacts 51 are closed during all intervals of the display of the green signal to the cross street except the last interval. Accordingly, after each closure of the relay 92 during these intervals for the establishment of a branch feed for the capacitor charging circuit, the relay 92 is released upon the next succeeding movement of the cam shaft so that it is available to be again energized upon a succeeding detector actuation during a subsequent one of these first series of intervals of the cross street green signal.

It will be observed that I have provided with only one tube and two relays a traffic signal controller for the normal go system provided with means for adjusting the duration of the display of each signal indication, the extension of the cross street green indication and the memory feature for effecting cyclic operation of the controller upon cross street actuation during the last interval of the cross street green signal display, the cross street amber signal display and the main street green signal display.

What I claim is:

1. A signal controller for controlling the go, caution and stop signals at the intersection of a main street and a cross street, a cam shaft having a series of cams thereon, a switch actuated by each cam, certain of said switches being connected in signal circuits, a motor operatively connected to said shaft to effect rotation thereof step by step through a succession of intervals, there being one interval for the display of the main street go signal, one interval for the display of the main street caution signal, one interval for the display of the cross street caution signal, and a plurality of intervals for the display of the cross street go signal, a starting circuit for said motor, an electron discharge tube, a relay connected in the output of said tube, said output circuit including one of said cam actuated switches closed during all intervals except display of the main street green signal, said output circuit having a branch circuit including a contact on said second relay, a motor running circuit energized through another one of said cam actuated contacts normally open and being closed only during rotation of the cam shaft, a condenser connected to the control element of said tube, a condenser charging circuit including another cam actuated switch normally open and closed during each rotative movement of the cam shaft, a feed circuit for said charging circuit including another cam operated switch closed during the display of the main street go signal, main street amber signal, and cross street amber signal and the first interval of the display of the cross street green signal, a second feed circuit for said charging circuit including another contact on said second relay, said charging circuit including means operable upon closure of the contact in said charging circuit and the contact in either of said feed circuits to apply negative potential on said control element, a detector element positioned in the cross street for actuation by traffic approaching the intersection, a detector element circuit including another cam actuated switch closed during all intervals except display of the main street amber signal, said detector element being operable upon actuation during closure of said last mentioned switch to energize said second relay and close the contacts thereof, and a condenser discharge circuit including a plurality of said cam actuated switches, one of which is closed during display of the main street go signal, a second of which is closed during display of the main street amber signal, a third of which is closed during display of the cross street amber signal, a fourth of which is closed during display of the cross street go signal during the first interval thereof, and the fifth of said switches being closed during display of the cross street go signal during the remaining intervals thereof.

2. A controller, as defined in claim 1, wherein a resistor is associated with each cam operated switch connected in said discharge circuit and each of said resistors being adjustable.

3. A controller, as defined in claim 1, wherein said second relay is provided with a holding contact connected in said detector element circuit.

4. A controller, as defined in claim 1, wherein there is provided an opposing potentializing circuit for the coil of said second relay, said circuit including another one of said cam actuated switches closed only during the first several intervals of the display of the cross street go signal, said switch being connected in series with a contact of said first relay when the same is deenergized and the cam operated switch in the motor running circuit.

5. A traffic signal controller for operating traffic signals through a cycle at a highway intersection, said controller comprising a cam shaft, a series of cams mounted on said shaft, a series of switches operated by said cams, certain of said switches being connected in signal circuits, a motor operatively connected to said cam shaft, a detector element positioned in one highway for actuation by traffic approaching the intersection on said highway, a timer for intermittently energizing the motor to effect step by step rotation of the cam shaft through a series of positions for the display of the signals through a cycle, a timer resetting circuit including one of said cam operated switches closed during movement of the cam shaft from each position to the next, a second cam operated switch closed during certain portions of the cycle, and a third switch closed upon actuation of said detector element, said second and third switches in said timer resetting circuit being connected respectively in series with said first switch.

6. A semi-actuated traffic signal controller for effecting the display of traffic signals at a highway intersection comprising a cam shaft, a series of cams on said shaft, a series of switches operated by said cams with certain of said switches being connected in signal circuits, a motor operatively connected to the cam shaft to effect rotation thereof, a timer operable when initiated to intermittently energize said motor to effect rotation of the cam shaft through a series of positions for the display of the signals through a cycle, a detector element positioned in one highway for actuation by traffic moving on the said highway, means operable upon actuation of said detector to initiate the timer through said cycle, said cam shaft being movable through a plurality of positions during the display of the go signal to the highway in which said detector element is positioned, said timer being operable upon actuation of said detector while the cam shaft is in any of such positions to effect prolongation of the time cam shaft in the next succeeding position.

References Cited in the file of this patent

UNITED STATES PATENTS

| | | |
|---|---|---|
| 2,090,619 | Biach et al. | Aug. 24, 1937 |
| 2,094,598 | Hitchcock | Oct. 5, 1937 |
| 2,126,431 | Von Opel | Aug. 9, 1938 |